United States Patent
Yeh et al.

(10) Patent No.: US 7,768,581 B2
(45) Date of Patent: Aug. 3, 2010

(54) TUNER MODULE

(75) Inventors: Tung-Jung Yeh, Tao Yuan Shien (TW); Lung Dai, Tao Yuan Shien (TW); Chih-Ping Wu, Tao Yuan Shien (TW)

(73) Assignee: Quanta Corporation, Tao Yuan Shien (TW)

( * ) Notice: Subject to any disclaimer, the term of this patent is extended or adjusted under 35 U.S.C. 154(b) by 983 days.

(21) Appl. No.: 11/500,396

(22) Filed: Aug. 8, 2006

(65) Prior Publication Data

US 2007/0064231 A1 Mar. 22, 2007

(30) Foreign Application Priority Data

Sep. 19, 2005 (TW) .............................. 94132334 A

(51) Int. Cl.
*H04N 5/50* (2006.01)
*H04N 5/455* (2006.01)

(52) U.S. Cl. ..................................... 348/731; 348/726

(58) Field of Classification Search ......... 348/725–728, 348/731–733; 455/182.3, 192.3; 334/1, 334/11, 17, 853; *H04N 5/44, 5/50, 5/455*
See application file for complete search history.

(56) References Cited

U.S. PATENT DOCUMENTS 6,603,517 B1 * 8/2003 Shen et al. .................. 348/554

7,043,215 B2 * 5/2006 Toporski et al. .......... 455/186.1

FOREIGN PATENT DOCUMENTS

| TW | 530491 | 5/2003 |
|---|---|---|
| WO | WO-2005/050983 A1 | 6/2005 |

* cited by examiner

*Primary Examiner*—Sherrie Hsia
(74) *Attorney, Agent, or Firm*—Rabin & Berdo, P.C.

(57) ABSTRACT

A tuner module including a first carrier, a tuner, a second carrier, a tuner connector, a digital modulator, a digital decoder, an analog decoder and a display unit is provided. The tuner is disposed on the first carrier for tuning the frequency to receive a source signal to generate a digital or an analog video signal. The tuner outputs the digital or the analog video signal via the tuner connector. The digital modulator receives the digital video signal via the tuner connector to output a transport stream. The digital decoder controls the display to display frames. The analog decoder receives an analog video signal via the tuner connector to generate a decoded signal. The display unit receives the decoded signal for controlling the display to display frames. The tuner connector, the digital modulator, the digital decoder, the analog decoder and the display unit are disposed on the second carrier.

14 Claims, 3 Drawing Sheets

| Connector pin | Corresponding signal | Connector pin | Corresponding signal |
| --- | --- | --- | --- |
| 1 | RESET | 2 | RF_AGC |
| 3 | Address Select | 4 | IF_AGC |
| 5 | SCL | 6 | 1.8V/2.5V |
| 7 | SDA | 8 | GND |
| 9 | 3.3V | 10 | Positive IF |
| 11 | GND | 12 | Negative IF |
| 13 | MPEG D0 | 14 | GND |
| 15 | MPEG D1 | 16 | Reserve |
| 17 | MPEG D2 | 18 | SIF_OUT |
| 19 | MPEG D3 | 20 | GND |
| 21 | MPEG D4 | 22 | ATUNER_CVBS |
| 23 | MPEG D5 | 24 | GND |
| 25 | MPEG D6 | 26 | Tuner 5V |
| 27 | MPEG D7/ Serial Data | 28 | IF 5V |
| 29 | MPEG TS CLK | 30 | LT 5V |
| 31 | MPEG PCK_SYNC | 32 | ANT 5V |
| 33 | MPEG TS Valid | 34 | GND |
| 35 | MPEG TS ERROR | 36 | GND |

FIG. 3

TUNER MODULE

This application claims the benefit of Taiwan application Serial No. 94132334, filed Sep. 19, 2005, the subject matter of which is incorporated herein by reference.

BACKGROUND OF THE INVENTION

1. Field of the Invention

The invention relates in general to a tuner module, and more particularly to an apparatus whose tuner module is replaceable.

2. Description of the Related Art

Conventional analog television receives analog signals first and displays images and sounds next. Due to the interference during analog transmission of signals, the analog television has poor performance in terms of display quality and noise screening.

Therefore, digital television (DTV) is gaining wider and wider popularity nowadays. The digital transmission of signals prevents interference of signals. The digital television is free of noise interference and outdoes the analog television by the advantages of high display quality, Hi-Fi stereo sounds, abundant channels and interactive function.

The tuner module is a critical device of television. The tuner module receives and processes a source signal to display frames. The tuner module has various designs corresponding to various types of the received source signals.

Currently, the digital television co-exists with the analog television and it is still a long way before the digital television can monopolize television market. Various types of televisions are still needed by the customers. After the design of the tuner module is completed, once the customers change their needs, the R&D personnel have to spend time and cost to change the design accordingly. If the tuner module is exported, the custom tariffs will be added to the cost and reflected to the price, affecting the competitiveness of the product.

SUMMARY OF THE INVENTION

It is therefore an object of the invention to provide a tuner module whose tuner is replaceable, so that the R&D personnel do not need to spend time and cost to re-design the tuner module.

The invention achieves the above-identified object by providing a tuner module. The tuner module includes a first carrier, a tuner, a second carrier, a tuner connector, a digital modulator, a digital decoder, an analog decoder and a display unit. The tuner is disposed on the first carrier. The tuner is for tuning the frequency to receive a source signal to generate a digital video signal if the source signal is digital and generate an analog video signal if the source signal is analog. The tuner connector is disposed on the second carrier and is electrically connected to the tuner. The tuner outputs the digital video signal or the analog video signal via the tuner connector. The digital modulator is disposed on the second carrier for receiving the digital video signal via the tuner connector to output a transport stream. The digital decoder is disposed on the second carrier for controlling a display to display frames according to the transport stream. The analog decoder is disposed on the second carrier for receiving an analog video signal via the tuner connector to generate a decoded signal. The display unit is disposed on the second carrier for receiving the decoded signal to control the display to display frames.

The invention further achieves the above-identified object by providing a tuner module. The tuner module includes a first carrier, a tuner, a second carrier, a tuner connector, a digital decoder, an analog decoder and a display unit. The tuner is disposed on the first carrier for tuning the frequency to receive a source signal to generate a transport stream if the source signal is digital and generate an analog video signal if the source signal is analog. The tuner connector is disposed on the second carrier and is electrically connected to the tuner. The tuner is for outputting the transport stream or the analog video signal via the tuner connector. The digital decoder is disposed on the second carrier for controlling a display to display frames according to the transport stream. The analog decoder is disposed on the second carrier for receiving an analog video signal via the tuner connector to generate a decoded signal. The display unit is disposed on the second carrier for receiving the decoded signal to control the display to display frames.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 3 illustrates a reference table of the pin definition for the tuner connector according to the invention.

DETAILED DESCRIPTION OF THE INVENTION

Figure 1:
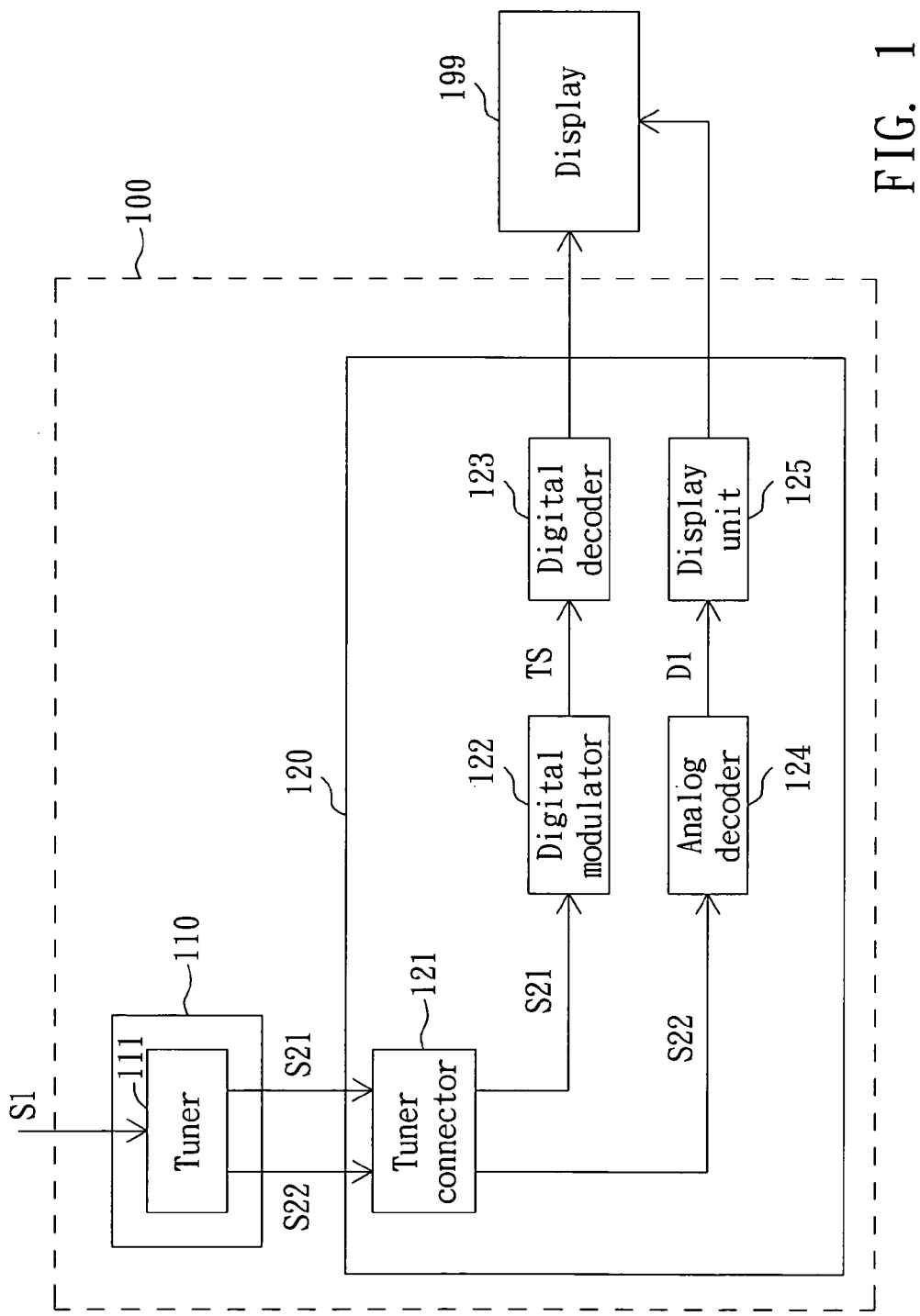
FIG. 1 illustrates a block diagram of a tuner module according to a first embodiment of the invention.

Referring to FIG. 1, a block diagram of a tuner module according to a first embodiment of the invention is shown. The tuner module 100 receives a source signal S1 for controlling the display 199 to display frames. The tuner module 100 includes a first carrier 110 and a second carrier 120. Examples of the first carrier 110 and the second carrier 120 include a print circuit board (PCB).

The first carrier 110 carries a tuner 111. The tuner 111 is for tuning the frequency to receive a source signal S1 to generate a digital video signal S21 if the source signal S1 is a digital television signal and generate an analog video signal S22 if the source signal S1 is an analog television signal.

The second carrier 120 carries a tuner connector 121, a digital modulator 122, a digital decoder 123, an analog decoder 124 and a display unit 125. The tuner connector 121 is electrically connected to the tuner 111. The tuner 111 outputs the digital video signal S21 or the analog video signal S22 to the second carrier 120 via the tuner connector 121 for subsequent processing.

The digital modulator 122 and the digital decoder 123 are used for processing the digital video signal S21. The digital modulator 122 is for receiving the digital video signal S21 via the tuner connector 121 to output a transport stream TS. Examples of the digital decoder 123 include an MPEG decoder. The digital decoder 123 is for controlling the display 199 to display frames according to the transport stream TS.

The analog decoder 124 and the display unit 125 are used for processing the analog video signal S22. The analog decoder 124 is for receiving analog video signal S22 via the tuner connector 121 to generate a decoded signal D1. The display unit 125 is for receiving the decoded signal D1 to control the display 199 to display frames.

Examples of the source signal S1 include a radio frequency (RF) signal. Examples of the digital video signal S21 include an intermediate frequency (IF) signal. Examples of the display 199 include a liquid crystal display panel.

The tuner 111 is electrically connected to the components disposed on the second carrier 120 via the tuner connector 121. Therefore, during the assembly process of the tuner module 100, an appropriate type of tuner 111 is adopted according to the design of the second carrier 120 or the needs of customers.

Figure 2:
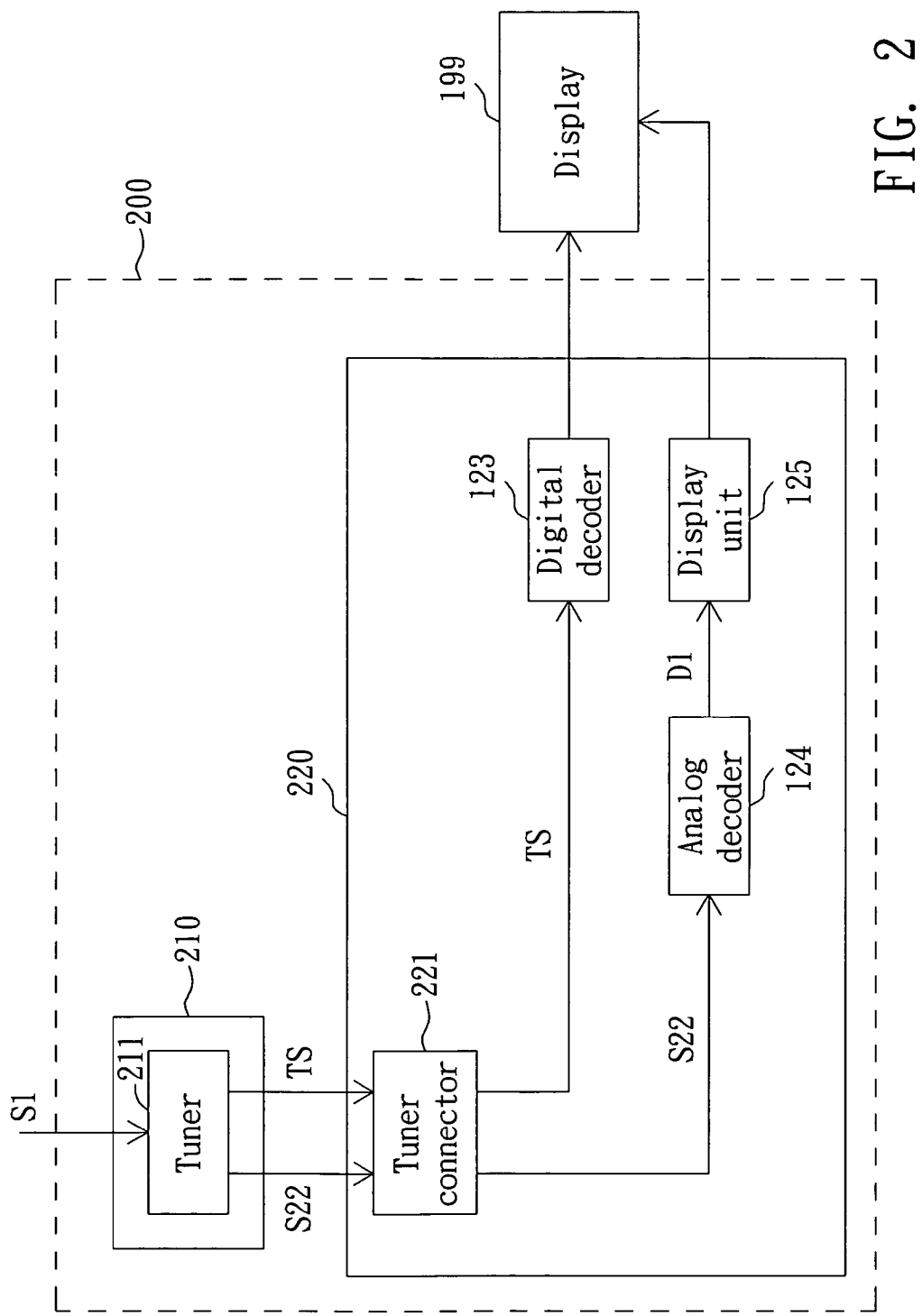
FIG. 2 illustrates a block diagram of a tuner module according to a second embodiment of the invention.

Referring to FIG. 2, a block diagram of a tuner module according to a second embodiment of the invention is shown. The tuner module 200 receives a source signal S1 for controlling the display 199 to display frames. The tuner module 200 includes a first carrier 210 and a second carrier 220. Examples of the first carrier 210 and the second carrier 220 include a PCB.

The first carrier 210 carries a tuner 211. The tuner 211 receives a source signal S1 to generate a transport stream TS if the source signal S1 is a digital television signal and generate an analog video signal S22 if the source signal S1 is an analog television signal.

The second carrier 220 carries a tuner connector 221, a digital decoder 123, an analog decoder 124 and a display unit 125. The tuner connector 221 is electrically connected to the tuner 211. The tuner 211 outputs the transport stream TS or the analog video signal S22 to the second carrier 220 via the tuner connector 221 for subsequent processing.

Unlike the tuner module 100 of the first embodiment, the tuner module 200 of the present embodiment does not include the digital modulator 122. However, the tuner 210 has the function of the digital modulator 122 for generating the transport stream TS and transmitting the transport stream TS to the digital decoder 123 via the tuner connector 221.

Referring to FIG. 3, a reference table of the pin definition for the tuner connector 121 or 221 according to the invention the tuner connector is shown. The control signal of the tuner 111 or 211 is transmitted through pins 5 and 7 of the tuner connector 121 or 221. Examples of the transmission interface of the tuner 111 or 211 include an inter-integrated circuit (12C) bus. In the pin 2, RF_AGC is for controlling the intensity of the source signal S1 received. In the pin 4, IF_AGC is for controlling the intensity of the digital video signal S21 such as an IF signal. In the pins 10 and 12, the digital video signal S21 (an IF signal for example) is converted into differential signals (the Positive IF and the Negative IF), and the differential signals are outputted via the pins 10 and 12 respectively. The pins 13, 15, 16, 17, 19, 21, 23, 25 and 27 are for transmitting the data signal relating to the digital video signal S21 or the transport stream TS. The clock signal of MPEG TS CLK is provided via the pin 29. The synchronical signal of MPEG PCK_SYNC is provided through the pin 31 for detecting the integrity of the transmitted package. The signals of MPEG TS Valid and the MPEG TS ERROR are provided via the pins 33 and 35 for controlling the transmission of the package.

The SIF_OUT signal is provided via the pin 18 for outputting a sound signal of analog video signal S22. The ATUNER_CVBS signal is provided via the pin 22 for outputting an image signal of the analog video signal S22. The pins 6, 8, 9, 11, 14, 20, 24, 26, 28, 30, 32, 34 and 36 are used for providing the tuner 110 or 210 with necessary voltage.

The tuner module disclosed in the above embodiments of the invention has the following advantages of:

1. Replacing the tuner according to the needs of customers;
2. Reducing the R&D personnel's time and costs relating to the re-design of tuner;
3. Reducing custom tariffs;
4. Reducing unnecessary material cost and facilitating offshore assembly;
5. Reducing the shortcomings relating to exterior appearance.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A tuner module, comprising:
   a first carrier;
   a tuner disposed on the first carrier for tuning the frequency to receive a source signal to generate a digital video signal if the source signal is a digital television signal and generate an analog video signal if the source signal is an analog television signal; and
   a second carrier;
   a tuner connector disposed on the second carrier and electrically connected to the tuner, wherein the tuner outputs the digital video signal or the analog video signal via the tuner connector;
   a digital modulator disposed on the second carrier for receiving the digital video signal via the tuner connector to output a transport stream;
   a digital decoder disposed on the second carrier for controlling a display to display frames according to the transport stream;
   an analog decoder disposed on the second carrier for receiving the analog video signal via the tuner connector to generate a decoded signal; and
   a display unit disposed on the second carrier for receiving the decoded signal to control the display to display frames.

2. The module according to claim 1, wherein the source signal is a radio frequency (RF) signal.

3. The module according to claim 1, wherein the digital video signal is an intermediate frequency (IF) signal.

4. The module according to claim 1, wherein the display is a liquid crystal display panel.

5. The module according to claim 1, wherein the first carrier is a print circuit board (PCB).

6. The module according to claim 1, wherein the second carrier is a PCB.

7. The module according to claim 1, wherein the digital decoder is an MPEG decoder.

8. A tuner module, comprising:
   a first carrier;
   a tuner disposed on the first carrier for tuning the frequency to receive a source signal to generate a transport stream if the source signal is a digital television signal and generate an analog video signal if the source signal is an analog television signal;
   a second carrier;
   a tuner connector disposed on the second carrier and electrically connected to the tuner, wherein the tuner outputs the transport stream or the analog video signal via the tuner connector;
   a digital decoder disposed on the second carrier for controlling a display to display frames according to the transport stream;
   an analog decoder disposed on the second carrier for receiving the analog video signal via the tuner connector to generate a decoded signal; and a display unit disposed on the second carrier for receiving the decoded signal to control the display to display frames.

9. The module according to claim 8, wherein the source signal is a radio frequency (RF) signal.

10. The module according to claim 8, wherein the digital video signal is an intermediate frequency (IF) signal.

11. The module according to claim 8, wherein the display is a liquid crystal display panel.

12. The module according to claim 8, wherein the first carrier is a print circuit board (PCB).

13. The module according to claim 8, wherein the second carrier is a PCB.

14. The module according to claim 8, wherein the digital decoder is an MPEG decoder.

* * * * *

UNITED STATES PATENT AND TRADEMARK OFFICE
CERTIFICATE OF CORRECTION

PATENT NO. : 7,768,581 B2  
APPLICATION NO. : 11/500396  
DATED : August 3, 2010  
INVENTOR(S) : Tung-Jung Yeh, Lung Dai and Chih-Ping Wu It is certified that error appears in the above-identified patent and that said Letters Patent is hereby corrected as shown below:

Title Page, Item 73 (Assignee)

"Quanta Corporation" should be changed to --Quanta Computer Inc.--

Signed and Sealed this

Second Day of November, 2010

David J. Kappos  
*Director of the United States Patent and Trademark Office*